US006968739B1

United States Patent
Baron et al.

(12) 
(10) Patent No.: US 6,968,739 B1
(45) Date of Patent: Nov. 29, 2005

(54) GAUGE AND METHOD FOR INDICATING A LEVEL OF A LIQUID IN A TANK

(76) Inventors: Joseph Baron, 15661 Producer La. #I, Huntington Beach, CA (US) 92649; David C. Abbe, 1780 E. Chase Ave., El Cajon, CA (US) 92020

( * ) Notice: Subject to any disclaimer, the term of this patent is extended or adjusted under 35 U.S.C. 154(b) by 0 days.

(21) Appl. No.: 10/764,208

(22) Filed: Jun. 4, 2004

(51) Int. Cl.[7] ............................................. G02B 5/14
(52) U.S. Cl. ......................... 73/293; 73/1.73; 340/619
(58) Field of Search .......................... 73/293; 340/619

(56) References Cited

U.S. PATENT DOCUMENTS

| | | | |
|---|---|---|---|
| 4,821,697 A | 4/1989 | McDougal | |
| 4,840,137 A | 6/1989 | Beauvals et al. | |
| RE34,601 E | 5/1994 | Hochstein | |
| D402,220 S | 12/1998 | Clifton | |
| 5,842,763 A | 12/1998 | Lakosky | |
| 5,859,365 A * | 1/1999 | Kataoka et al. | 73/149 |
| 6,073,487 A | 6/2000 | Dawson | |
| 6,167,920 B1 | 1/2001 | Enge | |
| 6,173,609 B1 * | 1/2001 | Modlin et al. | 73/293 |
| 6,658,933 B2 * | 12/2003 | Allegre et al. | 73/293 |
| 2002/0194911 A1 * | 12/2002 | Allegre et al. | 73/293 |

* cited by examiner

*Primary Examiner*—Hezron Williams
*Assistant Examiner*—Kaitna Wilson
(74) *Attorney, Agent, or Firm*—Eric Karich

(57) ABSTRACT

A gauge is disclosed for indicating a level of a liquid in a tank including a display device and a control unit coupled thereto. The display device includes multiple light-emitting elements. The control unit receives a liquid level signal, measures a magnitude of the liquid level signal, and activates a number of the light-emitting elements dependent upon the magnitude. In one embodiment the control unit receives a reset signal and performs a calibration routine in response. The gauge may include a housing and a cap portion attached to the housing. The display device and the control unit may be positioned within the housing. The gauge may include conveying means (e.g., an array of light pipes) for conveying light emitted by each of the light-emitting elements through an outer side surface of the cap portion. A method is described for indicating a level of a liquid in a tank.

12 Claims, 5 Drawing Sheets

GAUGE AND METHOD FOR INDICATING A LEVEL OF A LIQUID IN A TANK

BACKGROUND OF THE INVENTION

1. Field of the Invention

This invention relates generally to liquid container systems, and more particularly to systems and methods for measuring a level of a liquid in a tank.

2. Description of Related Art

Motor vehicles with internal combustion engines typically run on a liquid fuel such as gasoline stored in a fuel tank. Such vehicles typically include a fuel level monitoring system for indicating an amount (i.e., level) of the liquid fuel in the fuel tank. Most fuel level monitoring systems include a sending unit mounted in the fuel tank and a moving coil meter viewable by an operator of the vehicle. The sending unit and the moving coil meter are electrically connected in series. The moving coil meter includes a moving coil that rotates about a central axis. A pointer connected to the moving coil indicates the level of the liquid fuel in the fuel tank. An electrical resistance of the sending unit is dependent upon the level of the liquid fuel in the fuel tank, and determines a magnitude of an electrical current flowing through the sending unit and the moving coil meter. When the level of the liquid fuel in the fuel tank changes, the moving coil rotates, and the connected pointer indicates the change in the level of the liquid fuel.

In many known fuel level monitoring systems (i.e., fuel gauge systems), particularly those used in motor vehicles manufactured in the United States, the electrical resistances of the sending units in the fuel tanks are a maximum when the tanks are full and a minimum when the tanks are empty. A problem arises in such systems in that the maximum resistances of the sending units typically vary considerably. In order to ensure that fuel gauges read full at all possible maximum resistances of the sending units, the systems are typically configured such that the fuel gauges read full at fuel levels that are often substantially below full. As a result, as a level of fuel in a fuel tank begins to drop, a typical fuel gauge continues to read full, then drops relatively quickly from full to empty. This non-linear behavior of fuel gauges causes them to be highly inaccurate.

In order to give a motor vehicle operator as much time as possible to select a refueling facility, it would be beneficial to have a more accurate fuel gauge system.

SUMMARY OF THE INVENTION

A gauge is disclosed for indicating a level of a liquid in a tank including a display device and a control unit coupled to the display device. The display device includes multiple light-emitting elements. The control unit receives a signal indicative of the level of the liquid in the tank, measures a magnitude of the signal, and activates a number of the light-emitting elements of the display device dependent upon the magnitude of the signal.

In one embodiment the control unit receives a reset signal and responds to the reset signal by performing a calibration routine. The gauge may also include a housing and a cap portion attached to the housing. The display device and the control unit may be positioned within the housing. The gauge may also include conveying means (e.g., an array of light pipes) for conveying light emitted by each of the light-emitting elements of the display device through an outer side surface of the cap portion. A method is described for indicating a level of a liquid in a tank.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
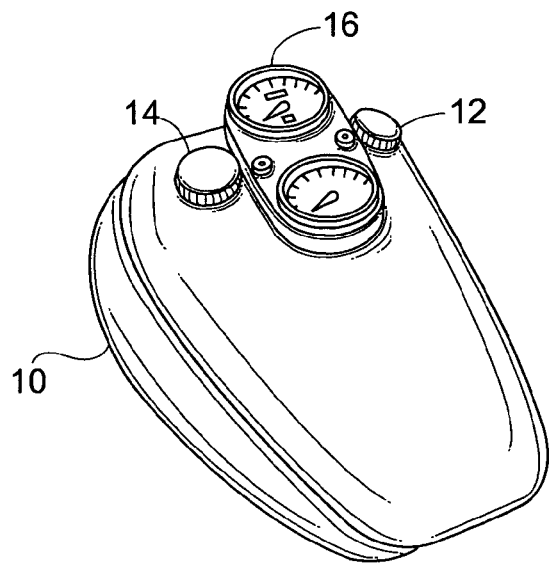
FIG. 1 is a perspective view of a motorcycle fuel tank including a filler cap mounted on a right side and one embodiment of a fuel level gauge (i.e., fuel gauge) mounted on a left side.

FIG. 1 is a perspective view of a motorcycle fuel tank 10 including a filler cap 12 mounted on a right side and one embodiment of a fuel level gauge (i.e., fuel gauge) 14 mounted on a left side. In general, the fuel gauge 14 is used to indicate a level of a liquid fuel (e.g., gasoline) stored in the motorcycle fuel tank 10. Positioned between the filler cap 12 and the fuel gauge 14 is an instrument cluster 16. In the embodiment of FIG. 1, the fuel gauge 14 substantially resembles the filler cap 12, advantageously lending a symmetrical look to the fuel tank 10. Other embodiments of the fuel gauge 14 are possible and contemplated.

As described below, the fuel gauge 14 includes a display device housed in a housing. The display device includes multiple light-emitting elements activated to indicate a level of fuel in the fuel tank 10. Light emitted by the light-emitting elements is conveyed out an exterior wall of the housing where the light can be observed by an operator of the motorcycle.

Figure 2:
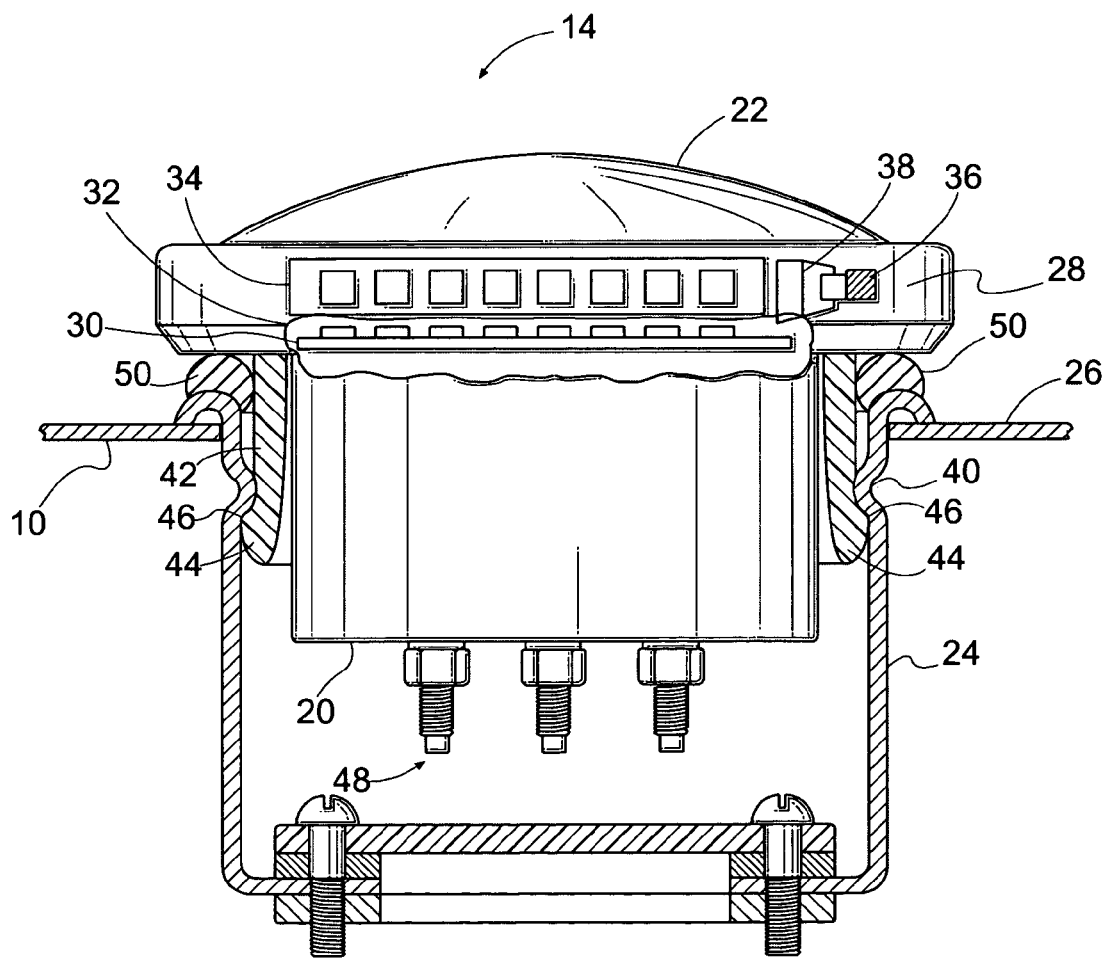
FIG. 2 is a side elevation view of the fuel gauge of FIG. 1 wherein a printed circuit board (PCB), multiple light-emitting diodes (LEDs) forming a display device, and an array of light pipes of the fuel gauge are shown.

FIG. 2 is a side elevation view of the fuel gauge 14 of FIG. 1. In the embodiment of FIGS. 1 and 2, the fuel gauge 14 includes a housing 20 and a cap portion 22 covering a cavity in the housing 20. The fuel tank 10 includes gauge mount cup 24 welded therein. The fuel gauge 14 normally resides in the gauge mount cup 24, but is removable from the gauge mount cup 24 for repair and/or replacement. When the fuel gauge 14 is positioned in the gauge mount cup 24 as shown in FIG. 2, the housing 20 resides in the gauge mount cup 24 and the cap portion 22 resides above an opening of the gauge mount cup 24 adjacent to an exterior surface 26 of the fuel tank 10.

In the embodiment of FIG. 2, the cap portion 22 of the fuel gauge 14 has a circular exterior side surface 28. As shown in FIG. 2, the side surface 28 is substantially perpendicular to the adjacent exterior surface 26 of the fuel tank 10. As described in more detail below, the fuel gauge 14 includes a printed circuit board (PCB) 30 positioned within the cavity of the housing 20. Multiple light-emitting diodes (LEDs) 32 are electrically connected (e.g., soldered) to the PCB 30 and extend from an upper surface of the PCB 30. The LEDs 32 form a display device, and are activated as described below to indicate a level of fuel in the fuel tank 10.

An array of light pipes 34 exits an opening the circular side surface 28 of the cap portion 22 of the fuel gauge 14. An outer surface of the array of light pipes 34 is substantially flush with the circular side surface 28. In the embodiment of FIG. 2, the array of light pipes 34 constitutes "conveying means" for conveying light emitted by the LEDs 32 out of the side surface 28 of the fuel gauge 14 where the light can be observed by the operator of the motorcycle.

An end 36 of a reset switch 38 is positioned within another opening in the circular side surface 28 of the cap portion 22. The reset switch 38 is electrically connected to the PCB 30. As described in detail below, when the operator of the motorcycle activates the reset switch 38, a control unit of the fuel gauge 14 performs a calibrate routine. The end 36 of the reset switch 38 is preferably substantially flush with the circular side surface 28.

In the embodiment of FIG. 2, the gauge mount cup 24 has inwardly projecting ribs or detents 40 for retaining the housing 20 of the fuel gauge 14. The housing 20 of the fuel gauge 14 has an outer annular member 42. The annular member 42 has multiple flexible projections 44 extending downwardly therefrom. Each of the flexible projections 44 has indented shoulder surfaces 46. The shoulder surfaces 46 engage corresponding outer surfaces of the projecting ribs or detents 40 of the gauge mount cup 24, thereby retaining the fuel gauge 14 within the gauge mount cup 24.

The fuel gauge 14 is removed from the gauge mount cup 24 by pulling on the cap portion 22 in an upward direction away from the exterior surface 26 of the fuel tank 10, thereby disengaging the shoulder surfaces 46 of the flexible projections 44 from the corresponding outer surfaces of the projecting ribs or detents 40 of the gauge mount cup 24.

To ensure the array of light pipes 34 is observable by the operator, the gauge mount cup 24 has longitudinal ribs (not shown) which engage corresponding detents in the housing 20, thereby preventing rotation of the fuel gauge 14 within the gauge mount cup 24.

In the embodiment of FIG. 2, terminals 48 extend downward from an underside surface of the housing 20. As described in more detail below, the terminals 48 are used to convey electrical power to the fuel gauge 14, to convey an excitation current to a sending unit located in the fuel tank 10, and to receive a voltage signal indicative of a level of the fuel in the fuel tank 10 from the sending unit. An annular sealing ring (i.e., O-ring) 50 is positioned about the outer annular member 42 of the housing 20 and between an underside surface of the cap portion 22 of the fuel gauge 14 and an upper surface of the gauge mount cup 24.

The retention mechanism by which the fuel gauge 14 is retained in the gauge mount cup 20 may be, for example, the retention mechanism described in U.S. Pat. No. 4,807,472 to Brown et al. and currently assigned to Harley-Davidson, Inc., incorporated herein by reference in its entirety.

Figure 3A:
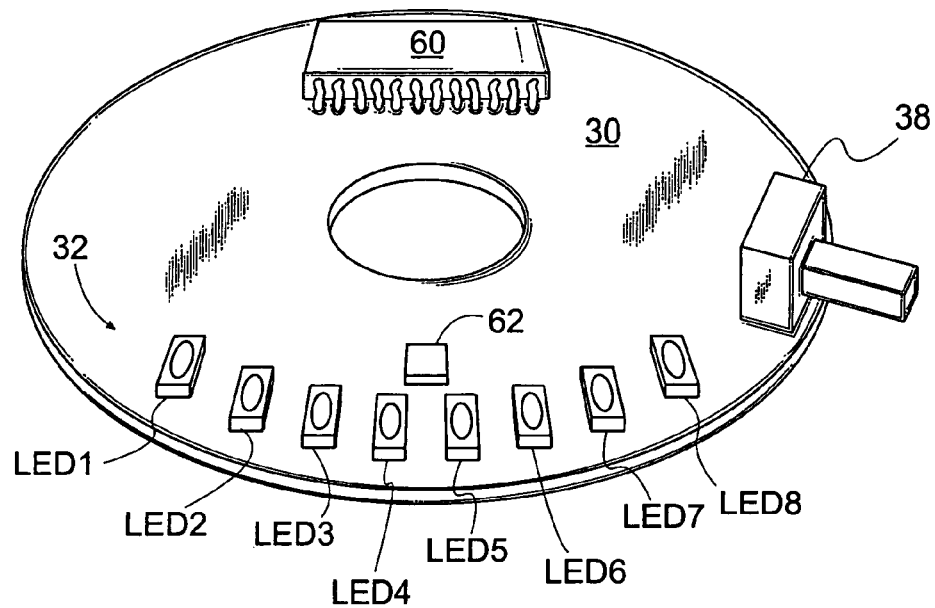
FIG. 3A is a perspective view of the PCB of FIG. 2.

FIG. 3A is a perspective view of the PCB 30 of FIG. 2. As described above, the LEDs 32 and the reset switch 38 are electrically connected (e.g., soldered) to the PCB 30 and extend from an upper surface of the PCB 30. In FIG. 3A the LEDs 32 includes 8 LEDs labeled "LED 1," "LED 2," "LED 3," "LED 4,", "LED 5," "LED 6," "LED 7," and "LED 8." The 8 LEDs 32 form a display device, and are activated to indicate a level of fuel in the fuel tank 10.

Also shown connected (e.g., soldered) to the PCB 30 and extending from an upper surface of the PCB 30 in FIG. 3A are a microcontroller 60 and a phototransistor 62. In the embodiment of FIG. 3A, the microcontroller 60 is part of a control unit of the fuel gauge 14 of FIGS. 1–2. The microcontroller 60 is electrically connected to the display device including the LEDs 32, the reset switch 38, and to the phototransistor 62.

The reset switch 38 is a momentary pushbutton switch, an produces a reset signal when pressed. The operator expectedly presses the reset button 38 immediately after filling the fuel tank 10. In this situation, the reset signal indicates a full level of the fuel in the fuel tank 10. When the microcontroller 60 receives the reset signal, the microcontroller 60 performs the calibration routine mentioned above and described in more detail below.

The microcontroller 60 also receives a voltage signal from the sending unit indicating a level of the fuel in the fuel tank 10. In general, the microcontroller 60 measures a magnitude of the voltage signal and activates a number of the LEDs 32 of the display device dependent upon the magnitude of the voltage signal.

Figure 3B:
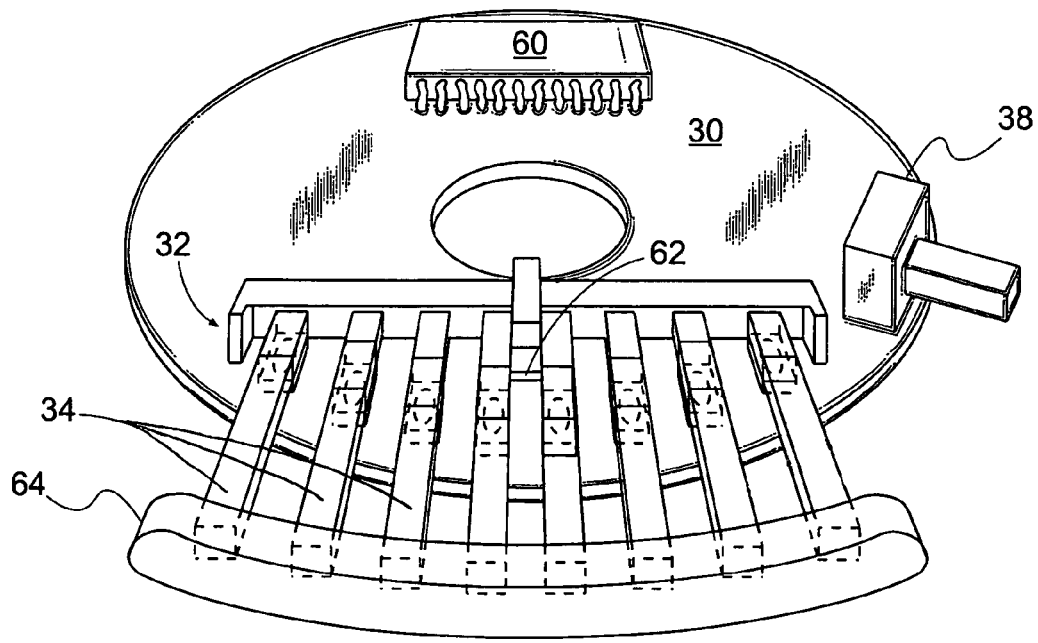
FIG. 3B is a perspective view of the PCB of FIG. 2 with the array of light pipes of FIG. 2 attached thereto.

FIG. 3B is a perspective view of the PCB 30 of FIG. 2 with the array of light pipes 34 of FIG. 2 attached thereto. As described above, the array of light pipes 34 conveys light emitted by the LEDs 32 out of the side surface 28 of the cap portion 22 of the fuel gauge 14 of FIG. 2 where the light can be observed by the operator. The array of light pipes 34 also conveys ambient light surrounding the surface 28 of the cap portion 22 of FIG. 2 to the phototransistor 62.

The microcontroller 60 activates each of the LEDs 32 of the display device via an activation signal that alternates between a positive voltage level and a reference ground voltage level. When a given activation signal is the positive voltage level, the corresponding LED produces light. When the activation signal is the reference ground voltage level, the corresponding LED does not produce light.

When a given one of the LEDs 32 is to appear to produce light continuously (i.e., not to flash or flicker), the activation signal produced by the microcontroller 60 has a frequency that is high enough that the LED appears to produce light continuously (i.e., does not appear to flicker). A duty cycle of each activation signal determines the amount of light produced by (i.e., the brightness of) the corresponding LED.

In general, the microcontroller 60 receives a signal from the phototransistor 62 and varies the duty cycles of the activation signals dependent upon the signal from the phototransistor 62. More specifically, the microcontroller 60 produces the activation signals for the LEDs 32 such that the activation signals are all the positive voltage level and the reference ground voltage level at substantially the same time. The microcontroller 60 samples the signal from the phototransistor 62 when the activation signals are the reference ground voltage level, and varies the duty cycles of the activation signals dependent upon the sampled signal from the phototransistor 62.

In the embodiment of FIGS. 3A and 3B, the display device includes 8 LEDs 32, and the array of light pipes 34 includes 8 light pipes 62 that terminate in an end piece 64. In general, the light pipes 62 and the end piece 64 are formed from a material that substantially transmits the light emitted by the LEDs 32. The material is preferably a scratch- and fade-resistant plastic material such as Lucite® (the DuPont Company, Wilmington, Del.).

Each of the 8 light pipes has two ends; one end is positioned above a corresponding one the LEDs 32, and the other end is embedded in the end piece 64. Light emitted by each of the LEDs 32 enters the adjacent end of the corresponding light pipe 62, exits the opposite end of the corresponding light pipe 62, and travels through the end piece 64, thereby exiting the side surface 28 of the cap portion 22. The end piece 64 is fitted into the opening in the side surface 28 of the cap portion 22 of FIG. 2 such that the end piece 64 substantially seals the opening to prevent liquids and foreign objects from entering the fuel gauge 14 via the opening.

Figure 4:
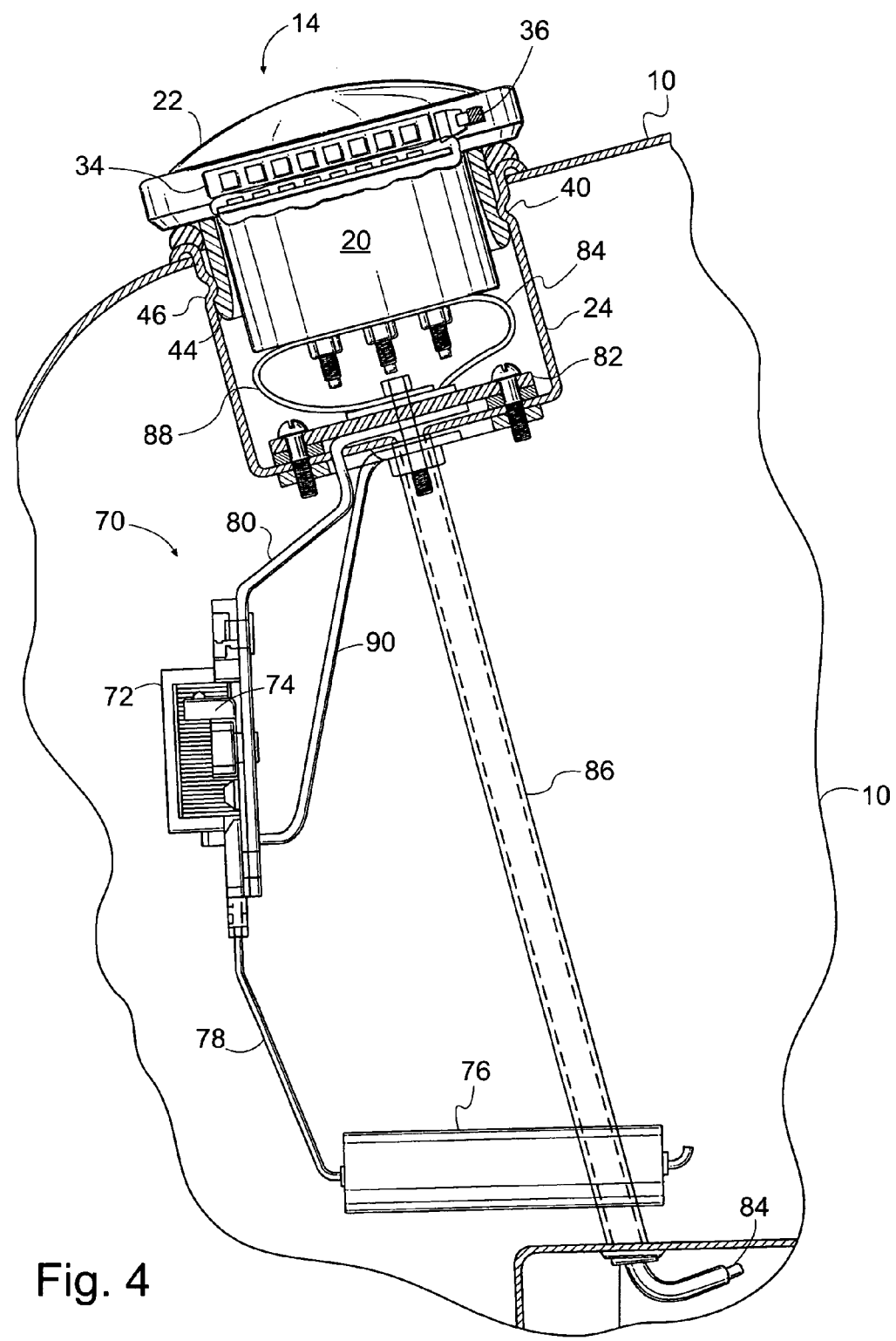
FIG. 4 is a cross-sectional view of the fuel tank of FIG. 1 illustrating how the fuel gauge may be connected to a sending unit located in the fuel tank.

FIG. 4 is a cross-sectional view of the fuel tank 10 of FIG. 1 illustrating how the fuel gauge 14 may be connected to a sending unit 70 located in the fuel tank 10. In the embodiment of FIG. 4, the sending unit 70 includes a variable resistor (i.e., rheostat) 72 having a moveable contact 74 pivotally connected to a float 76 via an arm 78. A bracket 80 extends from a bottom of a mounting plate 82 through a hole in the bottom of the gauge mount cup 24, and the variable resistor 72 is connected to the bracket 80.

The float 76 floats on an upper surface of the liquid fuel (e.g., gasoline) in the fuel tank 10. When the fuel tank 10 is full an electrical resistance of the variable resistor 72 is a minimum value. As the level of the fuel decreases, the float 76 moves downward with the upper surface of the fuel. The arm 76 connecting the float to the moveable contact 74 pivots about a pivot point, and the movable contact 74 moves. As a result, the electrical resistance of the variable resistance 72 is increased.

In the embodiment or FIG. 4, the fuel gauge 14 receives a positive power supply voltage via a wire 84 passing through a tube 86 located within the fuel tank 10, and the bracket 80 is connected to a reference ground voltage. The positive power supply voltage may be, for example, provided from a positive terminal of a battery via an ignition switch. When energized by the positive power supply voltage, the fuel gauge 14 provides a substantially constant electrical current to the moveable contact 74 of the variable resistor 72 via a wire 88 and a conductor 90. Impressed on the electrical resistance of the variable resistor 72, the constant electrical current causes the variable resistor 72 to produce a voltage signal indicative of the level of the fuel in the fuel tank 10. The voltage signal has a magnitude equal to a product of a magnitude of the constant electrical current and a value of the electrical resistance of the variable resistor 72. The fuel gauge 14 receives a voltage signal from the variable resistor 72 via the wire 88 and the conductor 90.

Figure 5:
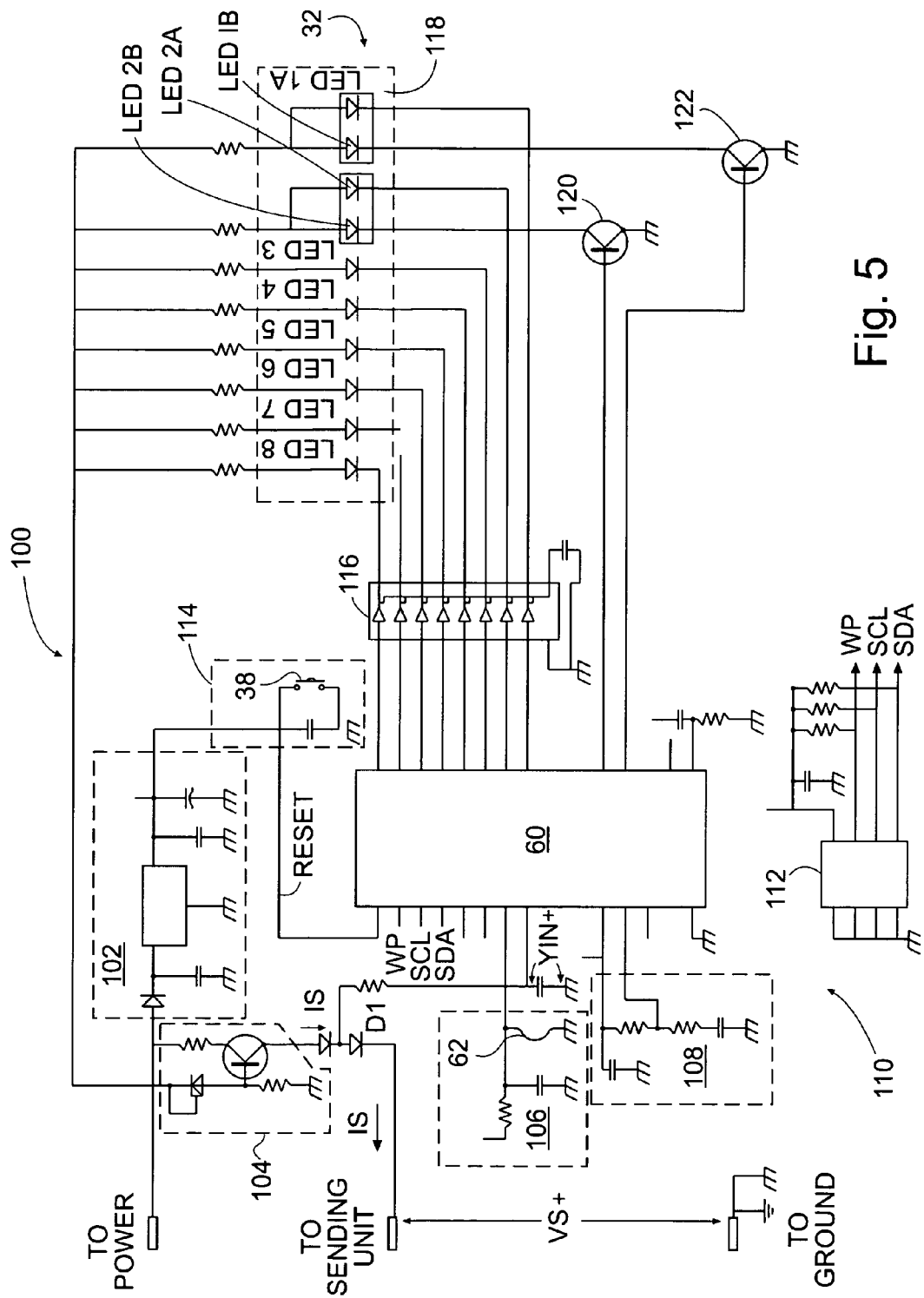
FIG. 5 a diagram of one embodiment of an electrical circuit formed upon the PCB of FIG. 2, wherein the electrical circuit includes a microcontroller.

FIG. 5 a diagram of one embodiment of an electrical circuit 100 formed upon the PCB 30 of FIG. 2. In the embodiment of FIG. 5, the electrical circuit 100 includes a constant voltage circuit 102, a constant current circuit 104, an ambient light detection circuit 106 including the phototransistor 62, a microcontroller reset circuit 108, a control circuit 110 including the microcontroller 60 and a memory device 112, a reset signal generation circuit 114 including the reset switch 38, a driver array 116, a display device 118 including the 8 LEDs 32, a first transistor 120, and a second transistor 122.

The constant voltage circuit 102 receives the power supply voltage formed between a positive power supply voltage and the reference ground voltage. When the power supply voltage is provided from a 12-volt lead acid battery, the positive power supply voltage may vary from about 10 volts direct current (VDC) to approximately 15 VDC. The constant voltage circuit 102 uses the power supply voltage to voltage "VCC" that is substantially constant. In the embodiment of FIG. 5, the voltage VCC is substantially +5 VDC. The voltage VCC is provided to the microcontroller 60 and the memory device 112 of the control circuit 110.

The constant current circuit 104 receives the power supply voltage and uses the power supply voltage to produce a substantially constant current "IS." As described above, the substantially constant current IS is provided to a sending unit located within a fuel tank (e.g., the sending unit 70 of FIG. 4). Impressed on an electrical resistance of a variable resistor of the sending unit (e.g., the variable resistor 72 of FIG. 4), the constant electrical current causes the variable resistor to produce a voltage signal indicative of the level of the fuel in the fuel tank. As described above, the voltage signal has a magnitude equal to a product of a magnitude of the constant electrical current and a value of the electrical resistance of the variable resistor.

In the embodiment of FIG. 5, the microcontroller 60 of the control circuit 110 receives a voltage signal "VIN" wherein a magnitude of the voltage signal VIN is a sum of magnitudes of the voltage signal produced by the variable resistor of the sending unit and a forward voltage drop of an isolation diode "D1."

Including the phototransistor 62, the ambient light detection circuit 106 produces a signal that is voltage VCC (i.e., high) when the ambient light level is below a threshold value, and is substantially the reference ground voltage (i.e., low) when the ambient light level is below the threshold value. The threshold value is dependent upon the value of a resistor of the ambient light detection circuit 106, and can be varied by changing the value of the resistor. The ambient light detection circuit 106 constitutes "light sensing means" for producing a signal indicative of an ambient light level.

As described above, the microcontroller 60 activates each of the LEDs 32 of the display device 118 via an activation signal that alternates between a positive voltage level and a reference ground voltage level. The microcontroller 60 receives the signal produced by the ambient light detection circuit 106 and samples the signal when the activation signals are the reference ground voltage level. In general, the microcontroller 60 varies the duty cycles of the activation signals dependent upon the sampled signal from the ambient light detection circuit 106. More specifically, the microcontroller 60 varies the duty cycle of each activation signal between a maximum value and a minimum value dependent upon the sampled signal from the ambient light detection circuit 106. The duty cycle is the maximum value (e.g., about 90 percent) when the sampled signal is high, and the minimum value (e.g., approximately 50 percent) when the sampled signal is low.

The microcontroller reset circuit 108 produces a signal that resets the microcontroller 60 when the voltage VCC is provided to the microcontroller 60 following an absence of the voltage VCC.

The memory device 112 is coupled to the microcontroller 60. The microcontroller 60 uses the memory device 112 to store data. The memory device 112 is preferably a non-volatile memory device. In the embodiment of FIG. 5 the microcontroller 60 is a part number HT46R22 manufactured by Holtek Semiconductor Inc. (Hsinchu, Taiwan) and the memory device 112 is a part number 24LC02B manufactured by Microchip Technology Inc. (Chandler, Ariz.). The memory device 112 is a serial electrically erasable programmable read only memory (EEPROM) device. The microcontroller 60 and the memory device 112 are connected via a serial data bus and communicate via the serial data bus.

The reset signal generation circuit 114 produces a "RESET" signal received by the microcontroller 60. In the embodiment of FIG. 5, the RESET signal is high when the reset switch 38 is not pressed, and goes low when the reset switch 38 is pressed. As described above, the operator expectedly presses the reset button 38 immediately after filling the fuel tank 10 (FIGS. 1, 2, and 4). In this situation, the reset signal indicates a full level of the fuel in the fuel tank 10. When the reset signal goes low, the microcontroller 60 performs the calibration routine mentioned above and described in more detail below. Including the reset switch 38, the reset signal generation circuit 114 constitutes "reset means" for producing the reset signal when activated.

In the embodiment of FIG. 5, 6 of the LEDs 32 (LED 8, LED 7, LED 6, LED 5, LED 4, and LED 3) emit green light when activated (i.e., are green LEDs). The LED 2 and the LED 1 each include two separate LEDs in a single package. The LED 2 includes a green LED labeled "LED 2A" in FIG. 5 and a red LED labeled "LED 2B" in FIG. 5. The LED 1 includes a green LED labeled "LED 1A" in FIG. 5 and a red LED labeled "LED 1B" in FIG. 5. The 2 separate LEDs of the LED 2 and the LED 1 are connected in a common anode arrangement. Anodes of the 8 LEDs 32 of the display device 118 are connected to the positive power supply voltage.

The cathodes of LED 8, LED 7, LED 6, LED 5, LED 4, LED 3, LED 2A, and LED 1A are connected to outputs of a driver array 116. The driver array 116 includes 8 inverting buffers. Corresponding inputs of the inverting buffers of the driver array 116 receive the activation signals produced by the microcontroller 60. As a result, when a given activation signal is the positive voltage level (i.e., the voltage VCC), the corresponding LED produces light. When the activation signal is the reference ground voltage level, the corresponding LED does not produce light.

The cathode of the red LED 2B is connected to a collector terminal of the transistor 120, and the cathode of the red LED 1B is connected to a collector terminal of the transistor 122. Base terminals of the NPN transistors 120 and 122 receive activation signals produced by the microcontroller 60, and emitter terminals of the NPN transistors 120 and 122 are connected to the reference ground voltage level. As a result, when a given activation signal is the positive voltage level (i.e., the voltage VCC), the corresponding LED produces light. When the activation signal is the reference ground voltage level, the corresponding LED does not produce light.

In general, the microcontroller 60 of FIG. 5 fetches instructions from a memory (e.g., the memory device 112 of FIG. 5) and executes the instructions. The instructions embody the method described below for indicating a level of a liquid in a tank (e.g., a liquid fuel in a fuel tank).

Figure 6:
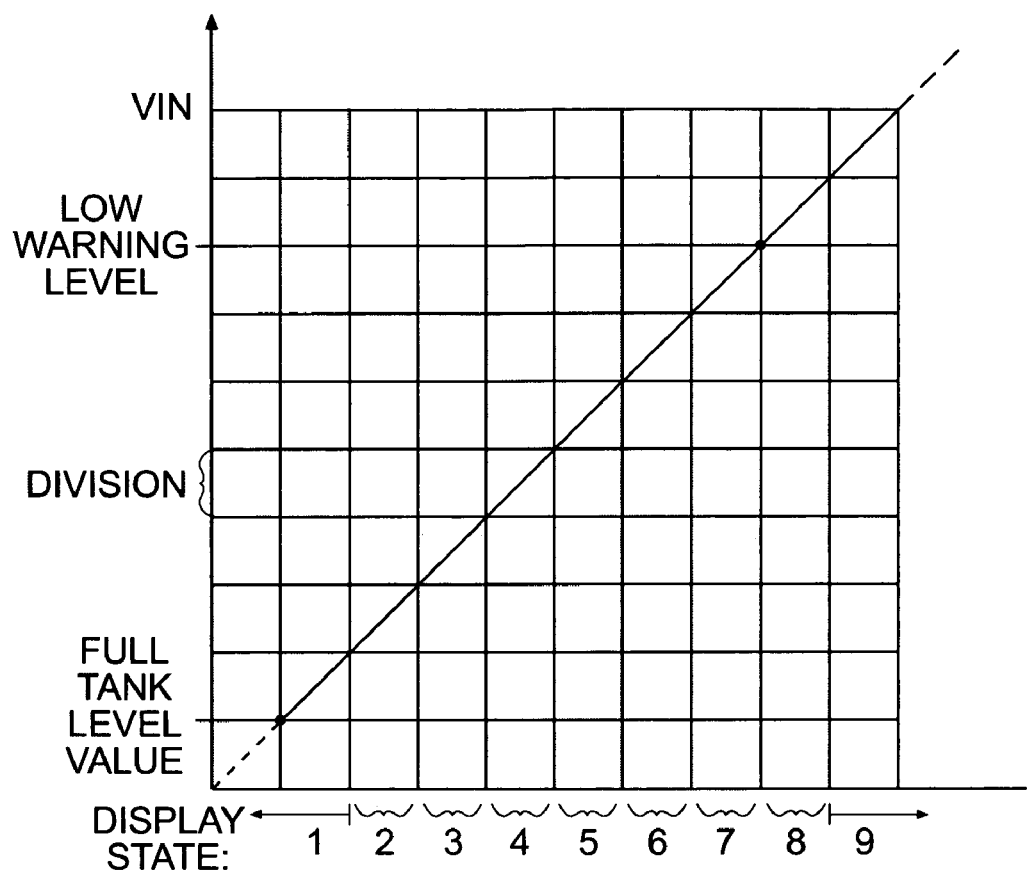
FIG. 6 is a graph of a voltage signal VIN received by the microcontroller of FIG. 5 illustrating corresponding states of the display device.

FIG. 6 is a graph of the voltage signal VIN received by the microcontroller 60 of FIG. 5 illustrating corresponding states of the display device 118 of FIG. 5. As described above, when the reset switch 38 (FIGS. 2, 3A, 3B, and 5) is pressed (e.g., by the operator immediately after the fuel tank 10 of FIGS. 1, 2, and 4 is filled), the RESET signal (see FIG. 5) goes low, and the microcontroller 60 performs the calibration routine.

During the calibration routine, the microcontroller 60 measures a magnitude of the voltage signal VIN (i.e., the fuel level signal). The microcontroller 60 equates the measured magnitude of the voltage signal VIN to a full tank level value, and stores the full tank level value (e.g., in the memory device 112 of FIG. 5).

In the embodiment of FIG. 6, the microcontroller 60 divides a range between the full tank level value and a low fuel warning level value into 7 equally-sized divisions. In the described motorcycle embodiment, the low fuel warning level value is generally determined by a manufacturer of the motorcycle. For example, the motorcycle manufacturer typically specifies an electrical resistance of a sending unit when a fuel gauge is to read low. In this situation, the low fuel warning level value is the product of the electrical resistance of the sending unit when the fuel gauge is to read low and the magnitude of the constant current IS (see FIG. 5) provided to the sending unit by the fuel gauge 14. The low fuel warning level value is preferably stored in a non-volatile memory of the fuel gauge 14 (e.g., in the memory device 112 of FIG. 5).

The microcontroller 60 may accomplish the dividing of the range by: (i) subtracting the full tank level value from the low fuel warning level to determine the range, and (ii) dividing the range by 7. The result is the size of one of the equally-sized divisions as indicated in FIG. 6.

Each of 7 states of the display device 118 corresponds to a different one of the 7 equally sized divisions between the full tank level value and a low fuel warning level value. An additional 2 states of the display device correspond to 2 of the same sized divisions above the low fuel warning level value as indicated in FIG. 6.

Following the above described calibration routine, the microcontroller 60 (FIGS. 3A, 3B and 5) measures the magnitude of the voltage signal VIN and activates a number of the LEDs 32 of the display device 118 (FIG. 5) dependent upon a particular one of the divisions in which the magnitude exists. More specifically, the microcontroller 60 activates the LEDs 32 of the display device 118 according to Table 1 below:

TABLE 1

Operational States of Each of the LEDs of the Display Device 118 In Each State of the Display Device 118.

| DISPLAY STATE | LED 1A | LED 1B | LED 2A | LED 2B | LED 3 | LED 4 | LED 5 | LED 6 | LED 7 | LED 8 |
|---|---|---|---|---|---|---|---|---|---|---|
| 1 | ON | OFF | ON | OFF | ON | ON | ON | ON | ON | ON |
| 2 | ON | OFF | ON | OFF | ON | ON | ON | ON | ON | OFF |
| 3 | ON | OFF | ON | OFF | ON | ON | ON | ON | OFF | OFF |
| 4 | ON | OFF | ON | OFF | ON | ON | ON | OFF | OFF | OFF |
| 5 | ON | OFF | ON | OFF | ON | ON | OFF | OFF | OFF | OFF |
| 6 | ON | OFF | ON | OFF | ON | OFF | OFF | OFF | OFF | OFF |
| 7 | ON | OFF | ON | OFF | OFF | OFF | OFF | OFF | OFF | OFF |
| 8 | OFF | ON | OFF | ON | OFF | OFF | OFF | OFF | OFF | OFF |
| 9 | FL | OFF | OFF | OFF | OFF | OFF | OFF | OFF | OFF | OFF |

In Table 1 above, "ON" signifies the corresponding LED is to appear to produce light continuously (i.e., not to flash on and off or flicker), "OFF" signifies the corresponding LED is not activated and does not produce light, and "FL" signifies the corresponding LED is to appear to flash on and off (e.g., at a 1 hertz rate).

In one motorcycle embodiment, the variable resistor 72 of the sending unit 70 (FIG. 4) has an electrical resistance of about 30 ohms when the fuel tank 10 is full and approximately 190 ohms at the low fuel warning level. The constant current circuit 104 (FIG. 5) provides a substantially constant current IS having a magnitude of about 18 milliamps to the sending unit 70. Impressed on an electrical resistance of the variable resistor 72 of the sending unit 70, the constant electrical current causes the variable resistor 72 to produce a voltage signal having a magnitude equal to: (i) about 0.5 volts when the fuel tank 10 is full, and (ii) approximately 3.4 volts at the low fuel warning level.

As described above, in the embodiment of FIG. 5, the microcontroller 60 of the control circuit 110 receives the voltage signal VIN wherein the magnitude of the voltage signal VIN is a sum of magnitudes of the voltage signal produced by the variable resistor 72 of the sending unit 70 (FIG. 4) and a forward voltage drop of the isolation diode D1. As a result, the voltage signal VIN has a magnitude equal to: (i) about 1.2 volts when the fuel tank 10 is full, and (ii) approximately 4.1 volts at the low fuel warning level.

Although the gauge 14 shown in FIGS. 1, 2, and 4 and described above is designed to indicate a level of a liquid fuel (e.g., gasoline) stored in the motorcycle fuel tank 10, it is noted that in general the gauge 14 may be used to indicate a level of any liquid stored in a tank.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A gauge for indicating a level of a liquid in a tank, comprising:
    a display device comprising a plurality of light-emitting elements;
    a control unit coupled to the display device and to receive a reset signal indicative of a full level of the liquid in the tank and a liquid level signal indicative of the level of the liquid in the tank; and
    wherein the control unit is configured to respond to the reset signal by performing a calibration routine, to measure a magnitude of the liquid level signal, and to activate a number of the light-emitting elements of the display device dependent upon the magnitude of the liquid level signals;
    wherein when performing the calibration routine, the control unit measures a first magnitude of the liquid level signal, equates the first magnitude of the liquid level signal to a full tank level, and divides a range between the full tank level and a low warning level into a plurality of equally-sized divisions.

2. The gauge as recited in claim 1, wherein following the calibration routine the control unit measures a second magnitude of the liquid level signal and activates the number of the light-emitting elements of the display device dependent upon a particular one of the divisions in which the second magnitude exists.

3. The gauge as recited in claim 1, further comprising reset means for producing the reset signal when activated.

4. The gauge as recited in claim 3, wherein the reset means comprises a momentary pushbutton switch.

5. The gauge as recited in claim 1, further comprising a housing and a cap portion attached to the housing, wherein the display device and the control unit are positioned within the housing.

6. The gauge as recited in claim 5, further comprising conveying means for conveying light emitted by each of the light-emitting elements of the display device through an outer side surface of the cap portion.

7. The gauge as recited in claim 6, wherein the conveying means comprises an array of light pipes.

8. A gauge for indicating a level of a liquid in a tank, comprising:
    a display device comprising a plurality of light-emitting elements;
    a control unit coupled to the display device and to receive a reset signal indicative of a full level of the liquid in the took and a liquid level signal indicative of the level of the liquid in the tank; and
    wherein the control unit is configured to respond to the reset signal by performing a calibration routines to measure a magnitude of the liquid level signal, and to activate a number of the light-emitting element of the display device dependent upon the magnitude of the liquid level signal;
    wherein when performing the calibration routine, the control unit measures a first magnitude of the liquid level signal, equates the first magnitude of the liquid level signal to a full tank level, and divides a range between the full tank level and a low warning level into a plurality of equally sized divisions; and
    further comprising light sensing means for producing a signal indicative of an ambient light level.

9. The gauge as recited in claim 8, wherein the control unit is coupled to receive the signal from the light sensing means and configured to vary a duty cycle of an activating signal to each of the light-emitting elements of the display device dependent upon the signal from the light sensing means.

10. The gauge as recited in claim 8, wherein the light sensing means comprises a phototransistor.

11. A method for indicating a level of a liquid in a tank, comprising:
    providing a display device comprising a plurality of light-emitting elements;
    receiving a reset signal indicative of a full level of the liquid in the tank;
    performing a calibration routine in response to the reset signal, wherein during the calibration routine a first magnitude of a liquid level signal indicative of the level of the liquid in the tank is measured and a result is produced;
    measuring a second magnitude of the liquid level signal; and
    activating a number of the light-emitting elements of the display device dependent upon the second magnitude of the liquid level signal and the result of the calibration routine;
    wherein the calibration routine comprises:
    measuring the first magnitude of the liquid level signal;
    equating the first magnitude of the liquid level signal to a full tank level; and
    dividing a range between the full tank level and a low warning level into a plurality of equally-sized divisions.

12. The method as recited in claim 11, wherein the activating comprises:
    activating a number of the light-emitting elements of the display device dependent upon a particular one of the divisions in which the second magnitude exists.

* * * * *